United States Patent
Akers, Jr. et al.

(10) Patent No.: US 8,552,141 B2
(45) Date of Patent: Oct. 8, 2013

(54) HYPER-BRANCHED POLYESTER FOR USE IN CPT TONER AND METHOD OF PREPARING THE SAME

(75) Inventors: Charles Edward Akers, Jr., Lexington, KY (US); Michael James Bensing, Lexington, KY (US); John Joseph Kraseski, Lexington, KY (US); Claudia Alexandra Marin, Lexington, KY (US); Jing X. Sun, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 529 days.

(21) Appl. No.: 12/630,494

(22) Filed: Dec. 3, 2009

(65) Prior Publication Data

US 2011/0136053 A1    Jun. 9, 2011

(51) Int. Cl.
*C08G 63/52* (2006.01)
*G03G 9/00* (2006.01)

(52) U.S. Cl.
USPC .................. 528/303; 528/302; 430/108.4

(58) Field of Classification Search
USPC .............. 528/272, 283, 302, 308.5, 303
See application file for complete search history.

(56) References Cited

U.S. PATENT DOCUMENTS

| | | | |
|---|---|---|---|
| 4,970,288 A * | 11/1990 | Larkin et al. | 528/272 |
| 2004/0186247 A1* | 9/2004 | Vandevoorde | 525/454 |
| 2010/0063204 A1 | 3/2010 | Hamasaki | |

* cited by examiner

*Primary Examiner* — Ling Choi
*Assistant Examiner* — Gennadiy Mesh

(57) ABSTRACT

A hyper-branched polyester and a method of making the same having a tri-functional monomer A3, a di-functional monomer B2 and a mono-functional monomer C1 having a monomer ratio of A3:B2:C1 from about 1:0.2:2 to about 1:1.4:0.2 for use in a chemically processed electrophotographic toner providing a lower fusing temperature. In one form, the hyper-branched polyester includes a tri-hydroxy monomer, a di-acid and its derivatives, and a mono-acid and its derivatives. In other forms, a substituted anhydride and a long chain hydrocarbon carboxylic acid and its derivatives may also be included in the di-functional monomer.

7 Claims, No Drawings

HYPER-BRANCHED POLYESTER FOR USE IN CPT TONER AND METHOD OF PREPARING THE SAME

BACKGROUND

1. Field of Invention

The present invention relates to chemically prepared toner compositions containing hyper-branched and/or dendritic shaped polyester resins.

2. Description of the Related Art

Toners used in electrophotographic printers are of two primary types, namely chemically prepared toners (CPT) and conventional mechanically milled toners. Typically, CPT has significant advantage over mechanically milled toner, including better print quality, higher transfer efficiency and lower torque properties. Furthermore, it is much easier and more energy efficient to control toner particle size and shape compared to milled toners.

There are several types of CPTs, including Suspension Polymerization Toner (SPT), Emulsion Aggregation Toner (EAT or LAT), toner made from a Dispersion of Pre-formed Polymer in solvent (DPPT) and a type of CPT made from a "chemical milling" method. Of all of these methods, EAT has an advantage in being able to control the toner particle size and shape to fit for desired optimum cleaning, doctoring and transfer properties.

In a typical EAT, the components include pigment, wax, and styrene acrylate copolymer latex binder. These copolymers have some disadvantages as toner binders compared to polyesters, which are widely used to make conventional mechanically milled toners. Polyesters typically have better mechanical properties compared to styrene-acrylic copolymers of similar melt viscosity characteristics. This makes them more durable and resistant to filming of cartridge components. Also, polyesters have better compatibility with color pigments, resulting in a wider color gamut. Furthermore, it is possible for a polyester to obtain excellent fusing without decreasing its glass transition temperature which may hurt ship/store and other properties.

Overall, polyester binder resins are usually favored in the electrophotographic industry as toner binders, however historically they have been rarely used to make CPT, due to the synthesis method and the difficulty to make them into latex. The limited resin selection in CPT process results in limited fusing and printing properties. Low molecular weight and low molecular weight distribution polymers like polyesters typically have very poor fusing performance and durability unless the molecular weight distribution can be broadened via the addition of a cross-linking agent. This process works well for conventionally milled toners that are melt-mixed in a twin-screw extruder. However, for polyester CPT made with the EA process, it is impossible to breakdown the cross-links to allow the dissolution in a solvent such as MEK or ethyl acetate.

Unlike free-radical polymerizations for styrene-acrylic copolymers, it is extremely difficult to obtain a high molecular weight polymer, which is excellent for higher temperature fusing, in condensation polymerizations without cross-linking. In addition, for energy use efficiency in fusing, it is also required to allow the toner to reach lower temperature fusing.

Previously, a means for producing polyester CPT with a high molecular weight distribution is disclosed in pending U.S. patent application Ser. No. 11/677,838 entitled "Polyester Chemically Prepared Toners with Broad Molecular Weight Distribution" assigned to the assignee of the present invention. This enables the achievement of excellent fusibility, equivalent to what can be obtained with mechanically melt-mixed and jet-milled toners.

The properties of a dendritic polymer, especially its non-perfect analogues, star shaped and hyper-branched polymer has initiated great interest recently. Their properties, such as large number of functional groups, highly branched but soluble in organic solvents, low solution viscosity, low melt viscosity at high temperature and shear rate, and the globular three dimensional structure has been used to improve or modify the material's thermal and mechanical properties.

There are many ways to make dendritic and hyper-branched polyesters. For example, an A2+B2+A3 type of reaction using polyethylene glycol, phthalic acid and trimellitic acid monomers results in low branching and high cross-linked polymer in the condensation polymerization. This type of polyester has limited use in CPT without further treatment due to the high quantity of gel formation.

The ABx system, where x=2, 3 or more, yields a highly branched, solvent soluble, non-cross-linked polymer, but the limited sources of A and Bx monomers and its cost limit its use in this application.

To prepare a highly branched polyester for use in a CPT, the A3+B2 system is a good choice. The wide variation and availability of the tri- and di-functional monomers, A3 and B2, the topology of the polymer can provide some special properties. But this system is designed, according to Flory's theory, as a cross-linking system and will reach a gel point at a certain monomer conversion stage. It is reported that the A3:B2 ratio can, in addition with other processing methods or end capping agents, control the gel point of the reaction and even prevent the gel formation. It is a challenge to control the topology of the polymer and avoid gel formation and at the same time set up the needed properties for the polymer to be useful in a toner.

SUMMARY OF THE INVENTION

A chemically processed electrophotographic toner comprises a latex emulsion containing a hyper-branched polyester containing a tri-functional monomer A3, a di-functional monomer B2 and a mono-functional monomer C1 having a molar ratio of A3:B2:C1 from about 1:0.2:2 to about 1:1.4:0.2 wherein at least one of the tri-functional monomer A3, the di-functional monomer B2 and the mono-functional monomer C1 contain one of a crystallinity functional group, a long chain hydrocarbon where C≥8, and a combination of a crystallinity functional group and a long hydrocarbon chain where C≥8 and the di-functional monomer B2 has substitutions, a polyester resin mixed with the hyper-branched polyester having an acid value of about 5 to about 50, a glass transition temperature (Tg) of about 40-80° C. at a heating rate of about 5° C. per minute, a peak MW (Mp) of about 2500 to about 40,000 as well as all values and increments therein, and molecular weight distribution (MWD) value of about 3 to about 25; and an aqueous dispersion of a pigment and a release agent with the pigment at a level of about 5% to 20% by weight, including all values and increments therein, a pigment to dispersant ratio from about 1:1 to 8:1 by weight and a particle size from about 50 nm to about 500 nm and the release agent release agent having a melting point from 60° C. to 140° C., a release agent to dispersant ratio from 1:1 to 11:1, and a particle size may be from about 50 nm to about 1000 um. In other embodiments the molar ratio of A3:B2:C1 is 1:1:1 and 1:0.75:1. The crystallinity functional group may be a polyethylene substituted carboxylic acid with a molecular weight greater than 280. In one form, the tri-functional monomer A3 is a tri-hydroxy functional monomer, the di-functional monomer B2 is a di-acid and/or its derivatives, and the mono-functional monomer C1 is a mono-acid and/or its derivatives. In other forms the di-functional monomer B2 contains a substituted anhydride. Or in another system, the A3 is a tri-carboxylic acid or its derivatives, the B2 is a di-hydroxyl containing monomer and the C1 is a mono alcohol monomer. The polyester resin may be a linear polyester or a low gel polyester.

In another form a hyper-branched polyester for use in a chemically processed electrophotographic toner comprises a tri-functional monomer A3, a di-functional monomer B2 and a mono-functional monomer C1 having a molar ratio of A3:B2:C1 from about 1:0.2:2 to about 1:1.4:0.2 wherein at least one of the tri-functional monomer A3, the di-functional monomer B2 and the mono-functional monomer C1 contain one of a crystallinity functional group, a long chain hydrocarbon where C≥8, and a combination of a crystallinity functional group and a long hydrocarbon chain where C≥8 and the di-functional monomer B2 has substitutions. In other forms the molar ratio of A3:B2:C1 is 1:1:1 and/or 1:0.75:1. The crystallinity functional group may be a polyethylene substituted carboxylic acid with molecular weight greater than 280. In other forms the tri-functional monomer A3 contains a tri-hydroxy monomer, the di-functional monomer B2 is a di-acid and/or its derivatives thereof, and the mono-functional monomer C1 is one of a mono-acid and/or its derivatives. In other forms the di-functional monomer B2 contains a substituted anhydride and a long chain hydrocarbon carboxylic acid and its derivatives.

Also disclosed is a method of making a hyper-branched polyester for use in a chemically processed electrophotographic toner. The method comprises making a mixture of a tri-functional monomer A3, a di-functional monomer B2 and a mono-functional monomer C1 in a molar ratio of A3:B2:C1 from about 1:0.2:2 to about 1:1.4:0.2 wherein at least one of the tri-functional monomer A3, the di-functional monomer B2 and the mono-functional monomer C1 contain one of a crystallinity functional group, a long chain hydrocarbon where C≥8, and a combination of a crystallinity functional group and a long hydrocarbon chain where C≥8 and the di-functional monomer B2 has substitutions; heating the mixture to a first temperature of about 100° C. until all the components are melted and mixed well; under nitrogen gas, increasing the temperature of the mixture to a second temperature of about 150° C. and holding the mixture at the second temperature for about two hours; increasing the temperature of the mixture to a third temperature of about 220° C. and holding the mixture at the third temperature for about four hours; and returning the mixture to room temperature.

In other forms the method a monomer ratio of A3:B2:C1 is 1:1:1 or a monomer ratio A3:B2:C1 is 1:0.75:1 may be used. Also the crystallinity functional group may comprise a polyethylene substituted carboxylic acid with molecular weight greater than 280. Further dibutyltin dilurate may be provided as a catalyst during raising the temperature of the mixture to the first temperature. Also the tri-functional monomer A3 may contain one of a tri-hydroxy monomer, the di-functional monomer B2 is a di-acid monomer and/or its derivatives thereof, and the mono-functional monomer C1 is a mono-acid monomer and/or its derivatives. The tri-hydroxy monomer may be selected from a group consisting of a glycerol and a trimethanolpropane; and the di-acid monomer may be selected from a group consisting of an adipic acid, a succinic acid, a maleic acid, a terephthalic acid, a succinic anhydride, a maleic anhydride, a terephthalic anhydride, a dodecenyl-succinic anhydride, a 2-dodecen-1-yl-succinic anhydride. Also the di-functional monomer B2 may contain a substituted anhydride.

DETAILED DESCRIPTION

It is understood that various omissions and substitution of the equivalents are contemplated as circumstances may suggest or render expedient, but these are intended to cover the application or implementation without departing from the sprit or scope of the claims of the present disclosure. It is to be understood that the present disclosure is not limited in its application to the details of components set forth in the following description. The present disclosure is capable of other embodiments and of being practice or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the terms "a" and "an" herein do not denote a limitation of quantity, but rather denote the presence of at least one of the referenced item.

The hyper-branched polyester resin described herein is highly branched, without gel formation, has a lower viscosity at high temperature and a high shear rate, and is easily emulsified and able to be used in the EA-CPT process.

In another aspect, the monomer selection provides the hyper-branched polyester with specific properties which overcome some of the shortcomings of hyper-branched polyester in the electrophotographic printing. It is common knowledge that most of the dendritic and hyper-branched polymers are amorphous due to the less entangled polymer chain and the three-dimensional shape. Another characterization regarding this amorphous nature is that these hyper-branched polymers are nonlinear. Most of the polyester structures are also not compatible with polyolefin type of chemicals. This hyper-branched polyester resin provides properties that overcome the drawbacks of polyester and hyper-branched polyester. It contains both ester and olefin functionality and makes these two functional groups compatible in one system. By specifying the monomers, the crystallinity compatibility with other components and functionality of the hyper-branched polyester can be adjusted. By forming a hyper-branched polymer that contains both ester and hydrocarbon type functionality, where a hydrocarbon components within the hyper-branched polymer represents, e.g., 8 or more carbon atoms, such as 8 or more methylene units or 7 methylene units and one methylene with methyl substitution, or 6 methylene units and two with methylene units with substituted methyl group etc, such a hyper-branched polymer, unexpectedly provided excellent results in electrophotographic printing using a CPT as it not only provided the low melt viscosity, good thermal stability, functionality for the toner, but also provided a lower fusing temperature and excellent scratch, smudge and crease resistance.

In one aspect, the present invention provides a hyper-branched polyester resin for use in an electrophotographic toner. The hyper-branched polyester is made by condensation polymerization with a three functional groups monomer (A3), a two functional groups monomer (B2), and a single functional group monomer (C1). The molar ratio will control the molecular weight and dendritic unit. The molar ratio of A3:B2:C1 system is preferred in the neighborhood of about 1:0.2:2 to about 1:1.4:0.2, more preferred is 1:1:1, most preferred is 1:0.75:1.

Generally, polyester synthesis involves two types of functional groups. One of them is the acid and its derivatives such as anhydride, acid halide, ester; the other type is the hydroxyl functional groups. These two types of monomers are mixed together and at different conditions form a new ester bond. Therefore, in the disclosed reaction, the monomer choice can also be divided into two groups. Either triacid or its derivatives with diol and mono-alcohols, or trialcohol with di-acid and mono-acid and the acid derivatives will make a similar kind of hyper-branched polyesters. For example, the A3 monomer can be chosen from two areas, tri-hydroxy functional monomer such as glycerol, trimethanolpropane or tricarboxylic acid monomers, such as trimellitic acid, tricarballylic acid.

Correspondingly, the B2 di-functional groups could be di-acid and its derivatives, or diol, such as 1,12-dodecanediol, 1,10-decanediol, 1,6-hexanediol, adipic acid, succinic acid, maleic acid, terephthalic acid, succinic anhydride, maleic anhydride, terephthalic anhydride, dodecenylsuccinic anhydride, 2-dodecen-1-yl-succinic anhydride.

The C1 mono functional monomers can be selected from stearyl alcohol, stearic acid, and UNILIN alcohols and UNICID carboxylic acids from Baker Hughes Inc, Houston, Tex.

A trialcohol system has many choices, preferred are glycerol and trimethanolpropane; the most preferred is trimethanolpropane and anything containing tri-primary hydroxyl functional groups with similar steric hindrances.

The di-acid can be selected from any di-acid or anhydride, such as, adipic acid, succinic acid, maleic acid, terephthalic acid, succinic anhydride, maleic anhydride, terephthalic anhydride, dodecenylsuccinic anhydride, 2-dodecen-1-yl-succinic anhydride, etc. The anhydride is more preferred, among which the dodecenyl succinic anhydride and 2-dodecen-1-yl-succinic anhydride are most preferred. The first reason for this is that the acid and anhydride have different reactivity toward the alcohols, therefore, by controlling the reactant, it is possible to control the reaction sequence of the di-functional groups and mono functional groups. This reaction sequence in certain ways further controls the branching and dendritic unit in the polymer structure. But the result was unexpected.

Our experimental results showed that not all hydrocarbon monomer selections can be used to successfully make the present hyper-branched polyester resin. For example polyethylene was found to be much better than polypropylene in providing the property of crystallinity in the hyper-branched polyester. We believe that hydrocarbons with tight polymer chain packing ability and non-branching structure provide the best results. When a crystalline compound such as high molecular weight polyethylene acid is introduced in the system through the end capping mono-functional compounds, some of the reactions failed due to the incompatibility of the two types of polymers. A phase separation occurred in the polymerization. The two phases of the product disappeared when the di-functional groups (i.e., B2) have substitutions, especially a hydrocarbon side chain, for example a substituted anhydride. It appears that the substitution and subsequent change in structure in the di-functional groups B2 also having a long hydrocarbon chain provides enhanced compatibility of the A3 and C1 monomers phases allowing them when mixed to form the present hyper-branched polyester resin. This compatibility along the three monomers provided an unexpected lower fusing temperature leading to more energy efficient electrophotographic printing.

The mono-acid can be chosen from any aliphatic acid with compatible functional groups tolerant in the polymerization, such as lauric acid, stearic acid, UNICID, a carboxylic mono-acid series from Baker Hughes, Houston Tex. The preferred mono-acids are UNICID 350, UNICID 425, UNICID 550 and UNICID 700 carboxylic acids. The most preferred mono-acids are UNICID 425 and UNICID 550 carboxylic acids. It is known that the UNICID carboxylic mono-acid has functionality as a release agent besides its crystallinity generated from the polyethylene unit. Unfortunately, due to its low molecular weight and other reasons, it did not function well as a release agent in the CPT process. On the other hand, introducing this type of mono-acid may provide the polymer extra properties other short chain acid cannot provide, at the same time overcoming its own shortcomings as a poor release agent. Its high melting point and lower reactivity toward alcohol compared with the di-functional anhydride make the reaction more economic and match the reaction sequence needed for the hyper-branched polymer.

The final net functional groups in the hyper-branched polymer depend on the ratio of the monomers. A typical structure could be represented as:

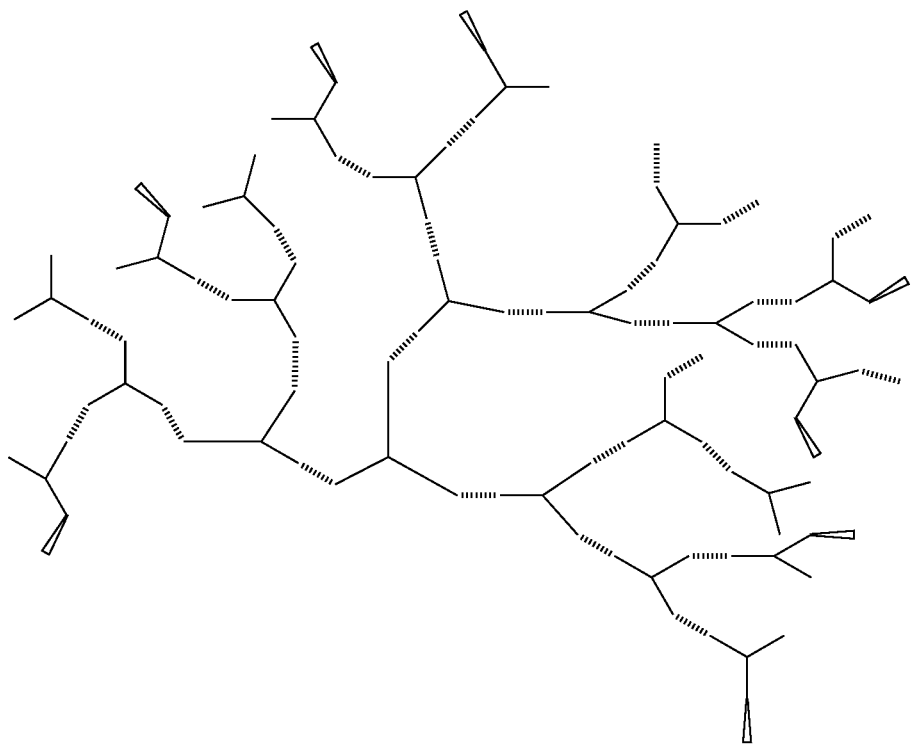

where:

||||||| represents Dodecenylsuccinic anhydride

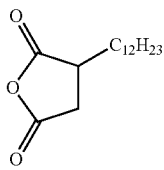

or, 2-Dodecen-1-yl-succinic anhydride

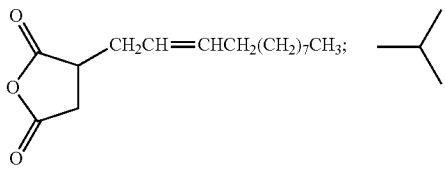

represents a trimethylolpropane (TMP)

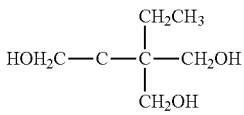

or glycerol
HOCH$_2$CH(OH)CH$_2$OH; and

◁ represents a mono-acid such as a long chain hydrocarbon carboxylic acid and its derivatives, UNICID (polyethylene carboxylic acid).

After the resin is synthesized, it is emulsified into an aqueous latex. The latex can be made in different ways. Typically, the hyper-branched polyester produced as above has enough functional groups to support a self-dispersed latex emulsion, which means just using a base will emulsify the resin into stable latex. Another method is using emulsifiers in the process. Any kind of surfactant can be used here. A surfactant containing carboxylic acid, or sulfonic acid functionality is preferred. The most preferred surfactant/dispersant should containing three types of functional groups, namely, hydrophobic groups which are not aqueous soluble; hydrophilic groups which are not only aqueous soluble but also have a pH sensitive ionic component; and a protective colloid group which may be the one that enhance stability in aqueous system and which may reduce the amount of ionic monomer component. Examples of these are the AKYPO series of carboxylic acids from Kao Corporation, Bunka Sumida-ku, Tokyo, Japan or the graft co-polymers made from free radical polymerization and disclosed in U.S. Pat. Nos. 6,991,884 and 5,714,538 and incorporated herein.

The hyper-branched polyester can be mixed with other components used for CPT. The various other components for the EA-CPT will be described below. It should be noted that the various features of the indicated components may all be adjusted to facilitate the steps of aggregation and formation of the toner particles size, shape and properties.

The hyper-branched polyester is mixed with another polyester resin such as a linear polyester or a low gel polyester. The typical polyester resin to be mixed with the hyper-branched polyester has the following properties. The acid value is about 5-50; such acid value may be due to the presence of one or a plurality of free carboxylic acid functionality in the resin. An acid value is reference to the mass of the potassium hydroxide (KOH) in milligrams that is required to neutralize one gram of the polyester. The polyester can also be characterized as having a glass transition temperature (Tg) as measured by differential scanning calorimetry (DSC), wherein the onset of the shift in baseline (heat capacity) thereby indicates that the Tg is at about 40-80° C. at a heating rate of about 5° C. per minute. In addition, the polyester herein may include those polyesters that have a peak MW (Mp) as determined by gel permeation chromatography (GPC) of about 2500-40,000 as well as all values and increments therein. In addition, the polyester suitable for use herein may be characterized by the molecular weight distribution (MWD) value, wherein the MWD value may have a value of about 3-25. The most preferred polyesters are described in pending U.S. patent application Ser. No. 11/677, 838 entitled "Polyester Chemically Prepared Toners with Broad Molecular Weight Distribution" assigned to the assignee of the present invention. and/or NE701, NE2141, NE1569, FPESL-2 polyesters from Kao Corporation, Bunka Sumida-ku, Tokyo, Japan.

Another component is the colorant. Such colorant may be sourced from a variety of pigments and/or dyes, polymer dyes (which may be soluble in a given medium and in polymer resin). The pigment dispersion may therefore be prepared by mixing the pigment in water along with a dispersant. Any dispersant described above for dispersing the hyper-branched polyesters can be used here. The pigment may be present in the dispersion at a level of about 5% to 20% by weight, including all values and increments therein. In addition, the pigment may be further characterized as having a pigment to dispersant ratio from about 1:1 to 8:1 by weight and a particle size from about 50 nm to about 500 nm.

Another component is the release agent and/or wax. It may be prepared in water, along with a dispersant which is discussed above. The release agent herein may therefore be understood as any compound that may facilitate release of toner from a component in an electrophotographic printer (e.g. release from a roller surface). Example release agents contemplated herein therefore include polyolefin wax, ester wax, fatty acid esters, paraffin wax, carnauba wax, etc. The release agent may have a melting point from 60° C. to 140° C., preferred melting point from 75 to 100° C. The release agent to dispersant ratio may be from 1:1 to 11:1, preferred ratio may be 3:1 to 8:1 and most preferred ratio may be 5:1. The particle size of the dispersion may be from about 50 nm to about 1000 um.

EXAMPLES

Synthesis of the Hyper-Branched Polyester Resin and its Emulsion

Hyper-Branched Polyester A:

Form a mixture of trimethylolpropane 67.21 g, dodecenyl succinic anhydride 99.92 g, and UNICID-425 carboxylic acid 212.87 g in a molar ratio of 1:0.75:1. All the components are mixed in a glass reactor and the mixture is heated to a first temperature of about 100° C. or until all the components are melted and mixed well. Dibutyltin dilurate can add as a catalyst if necessary. The mixture is heated under nitrogen gas to a second temperature of about 150° C. and is held at this second temperature for two hours. Then the mixture is heated up to a third temperature of about 220° C. and held at this temperature for four hours. The heat is then turned off and the mixture is cooled to room temperature.

Once the product is solid it can be removed from the reactor and ground or broken into smaller pieces. Mix 1800 g deionized water and 40 g 4% NaOH and heat to about 90° C. Add 275 g of the hyper-branched polyester A pieces. Cover the reactor with foil and mix the polymer/water/base solution with a high shear mixer at 10,000 rpm for 20 minutes at a temperature above 90° C. The emulsion formed contains about 13.84% solids by weight and has an average particle size of about 322 nm.

Hyper-Branched Polyester B:

Weigh out trimethylolpropane, dodecenyl succinic anhydride, and UNICID 425 carboxylic acid in a molar ratio of 1:1:1. For a 400 g batch that will be 65 g trimethylolpropane, 129 g dodecenyl succinic anhydride, and 206 g UNICID 425 carboxylic acid. The reaction procedure is the same as given for the hyper-branched polyester A example.

Once the product is cool, it is removed from the reactor and broken into smaller pieces. To make the emulsion, dissolve 11.72 g AKYPO RLM-100 polyoxyethylene(10) lauryl ether carboxylic acid in 550 g of deionized water and 28 g of 4% NaOH (used to neutralize the acidic AKYPO) with an electric stirrer and heat the water to about 90° C. Add 50 g of the hyper-branched polyester resin B into the dispersant solution. Cover the reactor with foil and stir the mixture with a high shear mixer at 10,000 rpm for 20 minutes at a temperature above 90° C. The average particle size of the emulsion was about 216 nanometers.

Pigment Dispersion

Pigment dispersions may be prepared as follows. About 20 g of the AKYPO-RLM0100 polyoxyethylene(10) lauryl ether carboxylic acid is combined with about 900 g of de-ionized water. As noted above, one may also utilize the synthesized dispersant for the same purpose. The dispersant and water are mixed with an electrical stirrer followed by the relatively slow addition of 100 g of PB 15:3 pigment. When the pigment is completely wetted and dispersed, the mixture is then added to a microfluidizer apparatus to reduce the particle size. The solution is then run in the microfluidizer until the particle size is about 200 nm while the solution is cooled by the continuous addition of the relatively cold water. The final pigment dispersion is set to contain about 10-15% solids by weight.

Release Agent Dispersion

An example of release agent dispersion may be prepared as follows. About 10 g of the AKYPO-RLM0100 polyoxyethylene(10) lauryl ether carboxylic acid is combined with about 100 g of water. The mixture is then run through the microfluidizer until the temperature reaches about 90° C. This is then followed by the relatively slow addition of 50 g of POLYWAX 500 ethylene homopolymer from Baker Hughes Inc. while maintaining the temperature at about 90° C. for about 15 minutes. The emulsion is removed from the microfluidizer when the particle size is below 300 nm. The solution is then stirred at room temperature. The wax emulsion is set to contain about 10-18% solids by weight. One may also follow the same general method utilizing synthesized dispersant and/or change the ratio of the release agent to dispersant.

Toner Formulation

Toner A

The emulsion agglomeration CPT used in this example is an acid agglomeration with a pH reversal used to stop the growth of the toner particles. Components were added to a 2.5 liter reactor in the following percentages: 62.76% LE-323 polyester resin emulsion, 4.4% cyan pigment 15:3 dispersion, 5.95% polyethylene wax emulsion, and 26.9% hyper-branched polyester A emulsion. LE-323 is a polyester resin with acid value of 20-25, peak molecular weight of 12.3, Tg 50-55° C. that was made into an emulsion on a large scale by dissolving the resin in MEK, adding water and base under high shear, and removing the MEK to form an aqueous emulsion. (A detailed description of this polyester resin is provided in U.S. patent application Ser. No. 11/677,838). Deionized water is added so that the components are in a mixture that contains about 12.5% solids by weight.

Heat the components in the reactor up to 30° C. and start a circulation loop that consists of a high shear mixer and an acid addition pump. Send the mixture of toner components through the loop and start the high shear mixer at 10,000 rpm. Slowly add the acid to the mixer the high shear mixer so that the acid will get evenly dispersed in the toner mixture and there are no pockets of low pH. Acid addition takes about 4 minutes with 1% sulfuric acid with a pH of 1.9. Reverse the flow of the loop to get all the material back in the reactor and increase the reactor temperature to 35° C. so that the particles can grow. Check the particle size when the temperature reaches 35° C. and hold at this temperature until the particles reach the desired size. Once the particles are at size, the pH is raised to 6.06 to stop the growth. The heat is then increased to 91° C. so that the particles coalesce. The particles were held at 91° C. for 3 hours to reach the desired circularity.

The toner is dried in a 40° C. oven for three days and blended with finishing agents before being put into cartridges for print testing. The dried toner had a volume average particle size of 7.9 microns, measured by a COULTER COUNTER Multisizer 3 analyzer, manufactured by Beckman Coulter, Inc., Fullerton, Calif., fines (<2 microns) of 0.6% and a circularity of 0.954, both measured by a SYSMEX FPIA-3000 particle characterization analyzer, manufactured by Malvern Instruments, Ltd., Malvern, Worcestershire UK.

Toner B

This toner served as a control and followed the same procedure as Toner A, except additional LE323 resin was used in place of the hyper-branched polymer. The dried toner had a volume average particle size of 6.00 microns, measured by the COULTER COUNTER Multisizer 3 analyzer, fines (<2 microns) of 4.16% and a circularity of 0.970, both measured by the SYSMEX FPIA-3000 particle characterization analyzer.

The toner was tested on a fuser at a 50 ppm and compared with XEROX brand ECO toner and Toner B without the addition of the hyper-branched polyester. There are three components of fusing that are tested for each toner over a temperature range; these are scratch, smudge and crease.

Scratch resistance is evaluated on the Taber Abrader scale from 0 to 10 where 10 is the best. Unfused prints are prepared at 230% coverage on 24 pound paper and then fused over a temperature range in 5 degree increments. The Taber Abrader scratches the fused sheets multiple times with different forces and the point at which the toner is scratched off the sheet corresponds to a number value that is used to determine the fuse temperature range.

The smudge test is carried out on 50% and 100% coverage prints on 24 pound paper. The test for smudging consists of carefully tearing off a 2" piece of transparent tape applied to the printed area and then measuring the optical density of the removed tape (using the TOBIAS Model IQ150 densitometer, manufacturer by Tobias Associates, Inc. Ivyland, Pa.) in three locations on each tape sample and averaging the results. In the chart below, to the right of the solid line marks the range where acceptable smudge is achieved on 100% coverage prints and to the right of the smaller dashed line represents acceptable 50% coverage smudge. Toner A shows excellent smudge for 50% and 100% coverage through the whole range of fusing window.

The crease test measures any damage of the printed image when the paper is folded (creased). It is measured as a pixel change in the printed area at the creased position on a scale of 0 to 1; 1 being best, indicating no change in toner coverage. To the left of the heavy larger dashed line indicates the range where acceptable crease is achieved by each toner. The toner containing the hyper-branched polyester outperformed the other toners in fusing window by lowering the minimum fusing temperature about 10° C. as compared to the control sample (Toner B), while providing excellent scratch, smudge and crease resistance in printing as the lower fusing temperature. As shown in the following chart, for Toner A, the fusing temperature is about 10° F. lower than that of the control, Toner B, and the commercially available XEROX brand ECO Toner.

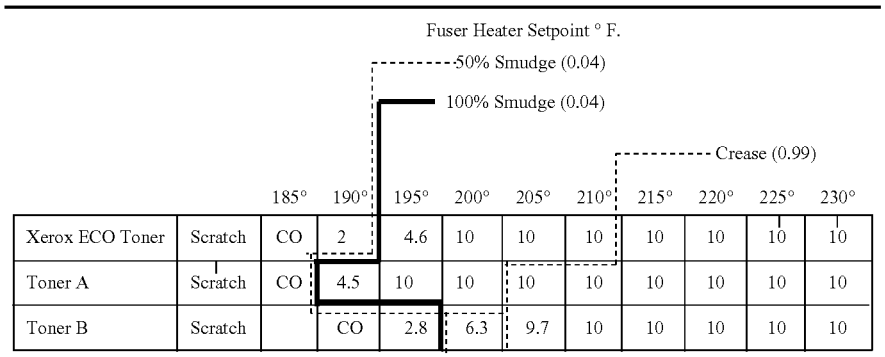

CO—Cold Offset

The foregoing description of the above method and the embodiment of the invention have been presented for the purpose of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A hyper-branched polyester consisting of a tri-hydroxyl monomer A3, selected from a group consisting of glycerol and trimethanolpropane, a di-acid monomer B2, selected from the group consisting of a dodecenyl succinic anhydride and a 2-dodecen-1-yl-succinic anhydride, and a mono-acid monomer C1, wherein a molar ratio of A3:B2:C1 is from about 1:0.2:2 to about 1:1.4:0.2; and the mono-acid monomer C1 contains a crystallinity functional group having a polyethylene substituted carboxylic acid with carbon chain lengths of C≥25 and the hyper-branched polyester is used in a chemically processed electrophotographic toner.

2. The hyper-branched polyester of claim 1 wherein the monomer ratio of A3:B2:C1 is 1:1:1.

3. The hyper-branched polyester of claim 1 wherein the monomer ratio A3:B2:C1 is 1:0.75:1.

4. A method of making a hyper-branched polyester of claim 1 comprising:
    making a mixture of a tri-hydroxyl monomer A3, a di-acid monomer B2 and a mono-acid monomer C1, wherein a molar ratio of A3:B2:C1 is from about 1:0.2:2 to about 1:1.4:0.2
    and heating the mixture to a first temperature of about 100° C. until all the components are melted and mixed
    under nitrogen gas, increasing the temperature of the mixture to a second temperature of about 150° C. and holding the mixture at the second temperature for about two hours;
    increasing the temperature of the mixture to a third temperature of about 220° C. and holding the mixture at the third temperature for about four hours; and
    returning the mixture to room temperature.

5. The method of claim 4 wherein the monomer ratio of A3:B2:C1 is 1:1:1.

6. The method of claim 4 wherein the monomer ratio A3:B2:C1 is 1:0.75:1.

7. The method of claim 4 further comprising providing dibutyltin dilaurate as a catalyst during raising the temperature of the mixture to the first temperature.

* * * * *